UNITED STATES PATENT OFFICE.

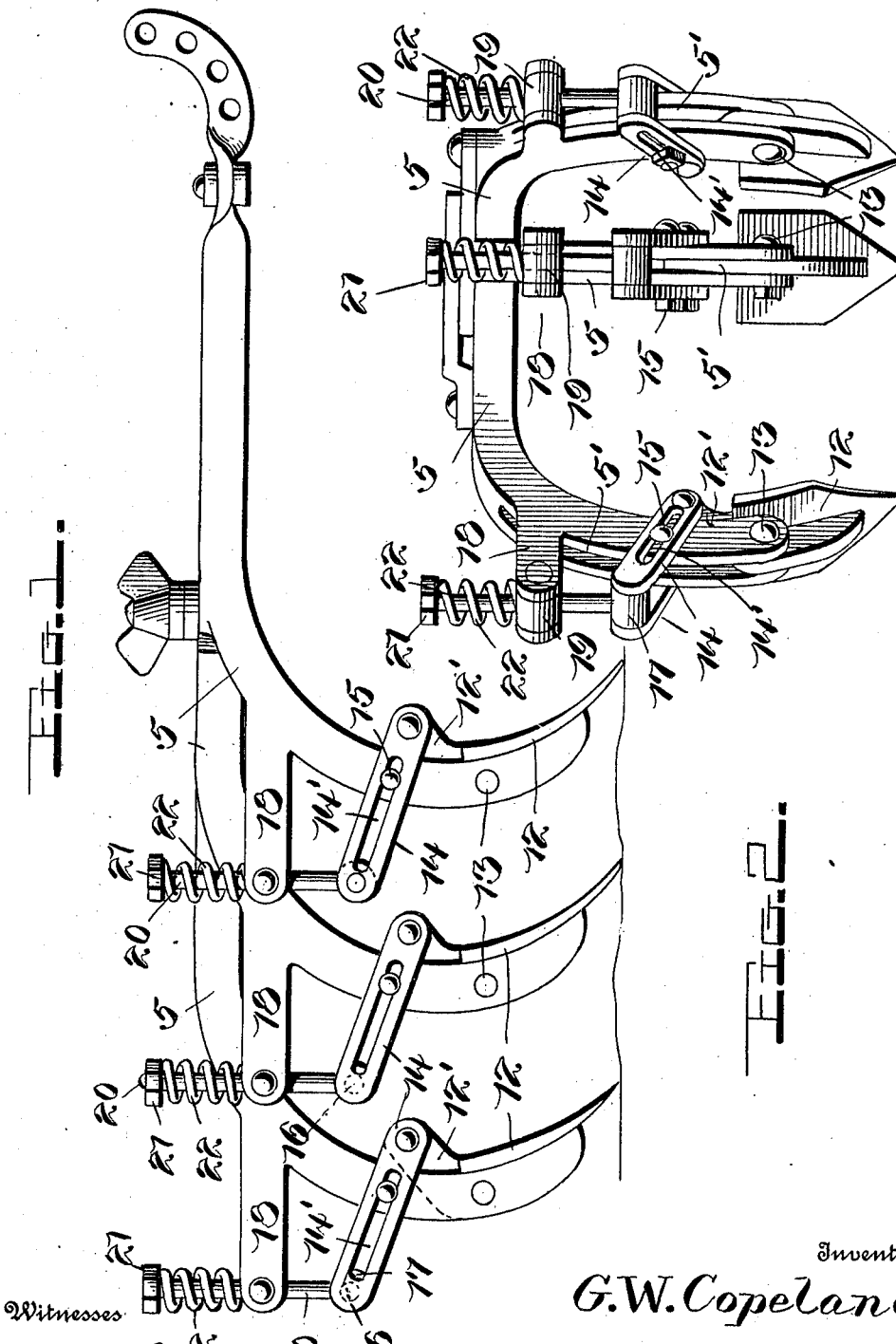

GEORGE W. COPELAND, OF BETHANY, MISSISSIPPI.

CULTIVATOR-TOOTH.

989,232.

Specification of Letters Patent.   Patented Apr. 11, 1911.

Application filed November 12, 1910.   Serial No. 592,123.

*To all whom it may concern:*

Be it known that I, GEORGE W. COPELAND, a citizen of the United States, residing at Bethany, in the county of Lee and State of Mississippi, have invented certain new and useful Improvements in Cultivator-Teeth, of which the following is a specification, reference being had to the accompanying drawings.

This invention relates to cultivator teeth and has for its object to provide a device of this character having a plurality of relatively adjustable plow blades whereby the feet may be positioned upon opposite sides of a row of plants of any width to properly harrow the ground and disturb the soil at the root of the plants.

Another object of my invention resides in the provision of novel means for mounting the harrow blades whereby they are yieldingly held in their proper operative positions and allowed to move when striking an obstruction, and means for supporting said plow blades and returning the same to their normal positions after passing the obstruction.

Another object of the invention is to provide a harrow of simple and durable construction, highly efficient in practical use and one which may be manufactured at small cost.

With these and other objects in view, the invention consists of the novel features of construction, combination and arrangement of parts hereinafter fully described and claimed, and illustrated in the accompanying drawings, in which—

Figure 1 is a side elevation of a harrow constructed in accordance with my invention; Fig. 2 is a rear end elevation.

Referring in detail to the drawing 5 designates the harrow beams which are connected at one of their ends for the attachment of the draft animals thereto.

The rear ends of the beams 5 are downwardly curved to provide standards which are bifurcated as shown at 5' to receive the blades 12 which are pivotally mounted therein, a pin 13 extending through the lower end of each harrow beam and blade. Each of these blades is mounted in a similar manner for movement upon the beams 5 when striking a rock, stump or other obstruction in the ground so that liability of injury to the machine is avoided. At the upper end of the blade the same is formed with a lug 12' and to this lug the link bars 14 are pivotally connected at one of their ends. These link bars extend upon opposite sides of the harrow beam 5 and are longitudinally slotted as shown at 14' to receive the pins 15 which are fixed in the harrow beam. These pins support the link bars for sliding movement.

The rear ends of the link bars 14 have secured therein the studs 16 and upon these studs the pivot bolt 17 is mounted for rocking movement. Rearwardly extending parallel arms 18 are formed with the harrow beam and also have mounted between them a pivot bolt 19 in a similar manner to the bolt 17. A rod 20 is fixed at one end to the bolt 17 and is movable through an opening provided in the bolt 19 which is mounted between the arms 18. The upper end of this rod is screw threaded to receive a nut 21 and between this nut and the bolt 19 a contractile spring 22 is arranged upon said rod. This spring normally acts to force the rod 20 downwardly and elevate the forward ends of the link bars 14 to which the plow blade 12 is connected.

In the use of the device, when the plow blade strikes a rock, tree stump or other obstruction, the same is moved backwardly upon the pin 13, the upper end thereof on which the ear 12' is formed moving forwardly and downwardly, whereby the link bars 14 are also drawn forwardly upon the pins 15. In this movement of the link bars the pivot bolt 17 is rotated upon the studs 16 and the upward movement of the rear ends of said bars forces the rod 20 upwardly and places the spring 22 under tension, one end of said spring bearing against the nut 21 while the other end thereof is fixed to the bolt 19. The pivot bolt 19, also rotates between the ends of the arms 18 in this movement of the links. When the plow blade has passed over the obstruction, the spring 22 immediately returns the same to its normal operative position. In this manner all danger of breaking the cultivating blade is eliminated, thus materially reducing the expense of maintenance.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. In a machine of the character described, the combination with a supporting beam, of a plow blade pivotally mounted thereon, slotted links arranged upon opposite sides of the supporting beam pivotally connected at one of their ends to the plow blade, pins fixed in the supporting beam extending through the slots in said links to guide the same, and means connecting the other ends of the links and the supporting beam and movable between the same to yieldingly hold the plow blade against pivotal movement.

2. The combination with a supporting beam, of a plow blade pivotally mounted thereon, links arranged upon opposite sides of the supporting beam for longitudinal movement, said links being pivotally connected to the plow blade at one of their ends, parallel arms extending rearwardly from the supporting beam, a pivot bolt rotatably mounted between the ends of said arms, a pivot bolt between the other ends of the links, a rod fixed to the bolt between the links and movably disposed through the bolt between said arms, and a contractile spring arranged upon the upper end of said rod to yieldingly hold said plow blade against pivotal movement.

In testimony whereof I hereunto affix my signature in the presence of two witnesses.

GEORGE W. COPELAND.

Witnesses:
W. J. HAMBLIN,
G. H. SMITH.

---

Copies of this patent may be obtained for five cents each, by addressing the "Commissioner of Patents, Washington, D. C."